United States Patent [19]

Jefferson

[11] Patent Number: 5,426,514
[45] Date of Patent: Jun. 20, 1995

[54] METHOD OF GRAY SCALING FACSIMILE IMAGES

[75] Inventor: Darrell E. Jefferson, San Jose, Calif.
[73] Assignee: Xerox Corporation, Stamford, Conn.
[21] Appl. No.: 207,246
[22] Filed: Mar. 4, 1994

Related U.S. Application Data

[63] Continuation of Ser. No. 854,158, Mar. 20, 1992, abandoned.

[51] Int. Cl.⁶ ............................................. H04N 1/40
[52] U.S. Cl. ................................. 358/455; 358/429; 358/401
[58] Field of Search .................. 358/455, 456, 429

[56] References Cited

U.S. PATENT DOCUMENTS

| | | | |
|---|---|---|---|
| 4,673,977 | 6/1987 | Stelzenmuller | 358/261.1 |
| 4,870,498 | 9/1989 | Schoon | 358/261.1 |
| 5,067,023 | 11/1991 | Kim | 358/261.1 |
| 5,113,455 | 5/1992 | Scott | 358/451 |

Primary Examiner—Edward L. Coles, Sr.
Assistant Examiner—Madeleine Nguyen
Attorney, Agent, or Firm—John M. Kelly; Tracy L. Hurt

[57] ABSTRACT

A system and method for creating data values suitable for producing a gray scaled approximation of a facsimile image on a lower resolution display. Facsimile image data is compressed based upon horizontal and vertical scaling factors that depend upon the number and organization of display screen pixels to be used to produce the gray scaled image verses the number and organization of pixels in the facsimile image. A conversion vector having entries in a one-to-one relationship with the display pixels of a display scan line is formed. Numerical values are then added to or subtracted from the conversion vector entries associated with the beginning and ending of the black runs of the facsimile image, as determined by using the horizontal scaling factor. The numerical values themselves depend upon how much of the conversion vector entry is spanned by the scaled black facsimile image run length. The contents of the conversion vector are then used to determine final intensity values suitable for controlling the intensity of individual pixels of a display scan line. Several facsimile image scan lines may be used to produce numerical values in the conversion vector, thus a display scan line may be formed by a plurality of facsimile image scan lines. Data for additional display scan lines may then be produced by resetting the conversion vector entries to zero and gray scaling additional facsimile image scan lines.

12 Claims, 10 Drawing Sheets

METHOD OF GRAY SCALING FACSIMILE IMAGES

This is a continuation of application Ser. No. 07/854,158, filed 20 Mar. 1992 now abandoned.

The present invention relates to techniques for displaying facsimile images on low resolution output devices.

BACKGROUND OF THE INVENTION

In recent years, personal computers and facsimile machines have become nearly indispensable tools to many businesses. In response, numerous companies have developed facsimile machines, hereinafter called fax cards, that integrate with personal computers. When a fax card receives a facsimile transmission, the received image is typically stored in computer memory for subsequent use, such as for display on a display screen or for output on a printer.

However, before a computer can display a received facsimile image, two issues related to the present invention must be addressed: (1) to reduce transmission time, most facsimile images are sent in a specially encoded data stream that requires decoding, and (2) facsimile images have a higher resolution than most computer output devices. Thus, one typically must both decode the received image data and reduce its resolution.

Beneficially, facsimile transmissions have been standardized by international agreement; currently, most transmissions are per the CCITT Group 3 specification. According to that specification, facsimile images are sent as a sequence of run length encoded data segments organized by horizontal lines that terminate with a special end-of-line (EOL) data sequence. The data segments represent the lengths (in number of picture elements, hereinafter called pixels) of, alternately, the white runs and black runs found in the original image. The encoding scheme, the EOL data sequence, and the scanning of the original are all controlled by the Group 3 specification. In particular, the original is scanned at either 3.85 (course mode) or 7.7 (fine mode) horizontal lines per millimeter (mm), with each horizontal line being 215 mm long and divided into 1728 evenly spaced pixels (other specified lengths and number of pixels are optionally permitted). Importantly, the first data segment sent for each horizontal scan line represents a run of white pixels.

As mentioned, in a typically computer/fax card system, a received facsimile image is stored before it is output. To reproduce the original image, the computer decodes the stored facsimile image, reduces its resolution to match the output, and applies the resulting data to the output device for display. Some prior art facsimile image decoding and reduction techniques degrade the image so much that even a small resolution reduction unacceptably distorts the visual image. However, it is known that gray scaling significantly improves the visual image. As used in this description and in the appended claims, "gray scale" refers to a series of at least three achromatic tones ranging between white and black and "gray scaling" refers to the process of producing such gray scale tones.

However, gray scaling a facsimile images using low cost computer systems is not usually done. This is believed to be because of the unacceptably slow execution using prior art decoding and gray scaling methods, and because those methods typically require large amounts of memory. Generally, prior art methods first completely decode the facsimile image to its bit-mapped form and then gray scale by processing the decoded bits. Since a bit-mapped representation of a facsimile image is frequently large (say about 0.5 Mbytes), and since gray scaling requires a blending of bits, the prior art methods generally require processing large amounts of data several times, thus the slow execution.

It would be advantageous to have a fast method of gray scaling a facsimile image.

SUMMARY OF THE PRESENT INVENTION

The present invention relates to techniques for converting source run length encoded data—such as facsimile image data according to G3 specifications—into gray scaled data suitable for controlling the intensity of individual pixels of an output device. Given the number and organization of the gray scale data points (one for each pixel) to be produced, the source run lengths are processed by scan lines to create gray scaled values for the data points of a destination (output) scan line. The process entails forming horizontal and vertical scaling factors based upon the resolution of the source image and the gray scaled data points. A conversion vector having entries in a one-to-one relationship with the data points of a destination scan line is initialized. The source run lengths are then sequentially scaled to adjusted run lengths by multiplying each source run length by the numerator of the horizontal scaling factor. The data points that correspond to the beginning and end of the adjusted run lengths are then found, and numerical values are determined and summed into the corresponding entries. The numerical values depend upon the destination resolution, the color represented by the source run lengths, the adjusted run lengths, and where the adjusted run lengths begin and end relative to the other adjusted run lengths. After all of the source run lengths for the scan lines associated with the destination scan line are processed, the conversion vector contains numerical values that range between a smallest value, nominally zero and a largest possible value (VALUE_OF_BLACK). The entries of the conversion vector are used to determine individual pixel intensities for a scan line of the output device. Based upon the vertical scaling factor, additional destination scan lines may then be processed.

BRIEF DESCRIPTION OF THE DRAWINGS

Other aspects of the present invention will become apparent as the following description proceeds and upon reference to the accompanying drawings, in which.

Note that in the drawings, like references designate like elements.

DETAILED DESCRIPTION OF THE ILLUSTRATED EMBODIMENT

The present invention relates to techniques for gray scaling run length encoded image data into data suitable for controlling the individual pixel intensities of an output device, such as a display. While the present invention is beneficially practiced within a system comprised of a low cost personal computer and a commercially available fax card, it is to be understood that the present invention is useful with many other systems; thus, the present invention is to be limited only by the appended claims.

Figure 1:
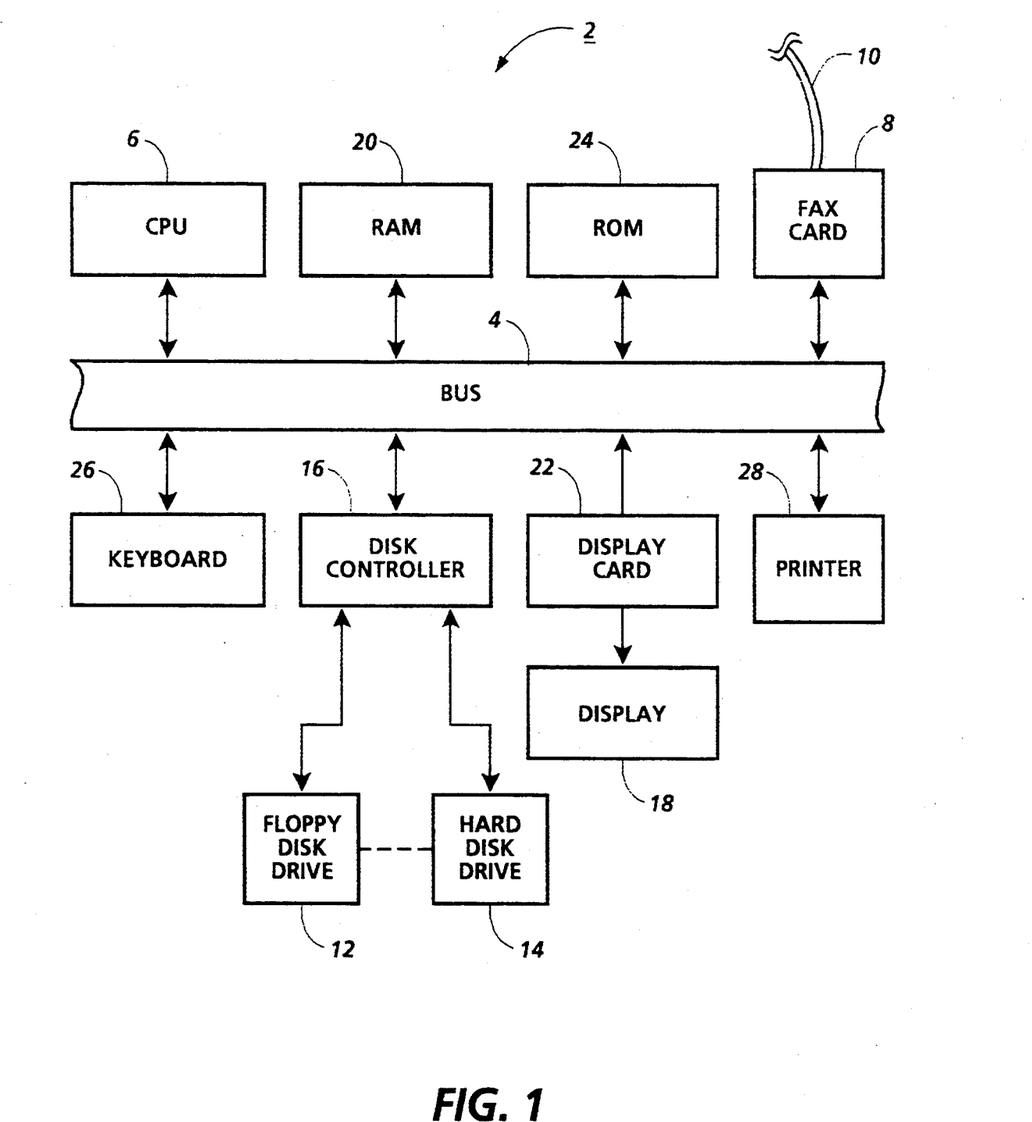
FIG. 1 shows a simplified block diagram of a computer and fax card system suitable for practicing the present invention.

A suitable system for practicing the present invention is the simplified system 2 shown in FIG. 1. The system 2 includes a bus 4 which interconnects a central processing unit 6 to a fax card 8. In operation the fax card receives a Group 3 type transmission over a telephone line 10. The received data is beneficially stored in a data file using either a floppy disk drive 12 or a hard disk drive 14 (as controlled by a disk controller 16). When a gray scale representation of the stored facsimile image is to be produced, a gray scaling program (which will presently be more particularly discussed) causes the CPU 6 to convert the stored facsimile image data into gray scaled data suitable for controlling the intensity of individual pixels of a display 18. Of course, other types of output devices are possible. Additionally, the present invention may be used without storing facsimile image data by decoding the image data as it is received. As the system 2 is implemented using a personal computer, also included is a RAM 20, a display card 22, a ROM 24, a keyboard 26, and possibly a printer 28.

As mentioned, a gray scaling program controls the processing of the stored facsimile image data into gray scaled data. One embodiment of a gray scaling program is the gray scaling program 200 illustrated in FIGS. 2 through 9, inclusive. Prior to operation of the gray scaling program 200, it is assumed that the number and the organization of the gray scaled data points to be produced is specified. Since the gray scaling program 200 produces data representative of the desired intensity values for individual pixels of the display 18, the number and the organization of the gray scaled data points relate to the number and organization of pixels in the display used to produce the visual image. Specifically, the number of pixels in each display scan line and the number of display scan lines are important. Conveniently, dimensions are specified by the number of items (pixels or scan lines) per unit length. The number of pixels per unit length in each display scan line is referred to as the horizontal resolution of the destination, while the number of scan lines per unit length is referred to as the vertical resolution of the destination.

Figure 2:
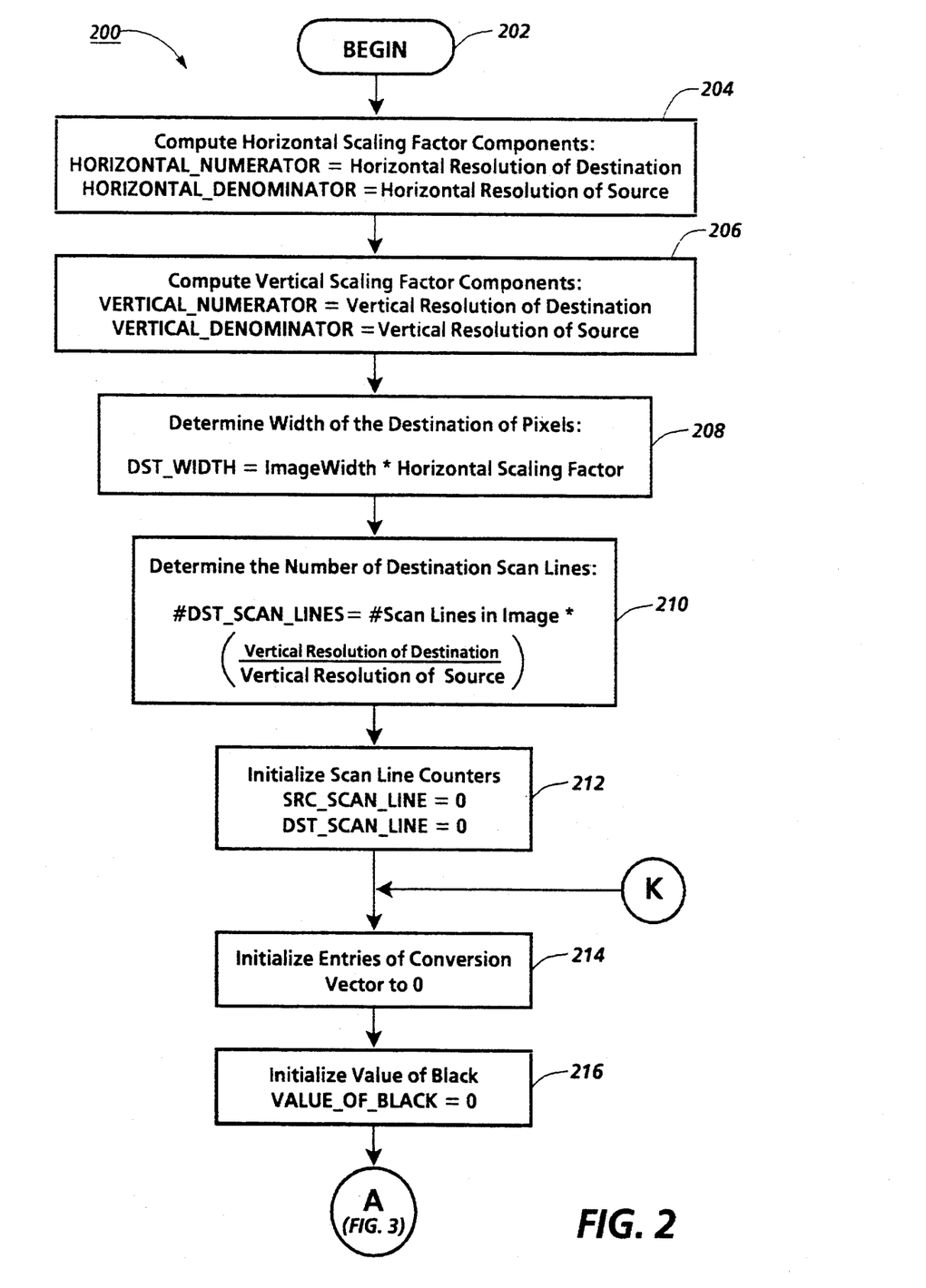
FIG. 2 shows the beginning steps, in flow chart form, of a gray scaling program 200 according to the principles of the present invention.

Referring now to FIG. 2, the gray scaling program 200 begins, step 202, and proceeds with the determination of the components of a horizontal scaling factor, step 204. The horizontal scaling factor relates the horizontal resolution (in pixels per unit length) of the destination with the horizontal resolution of the source (usually 1728 pixels). Thus, step 204 is performed by setting:

HORIZONTAL_NUMERATOR = horizontal resolution of destination;

HORIZONTAL_DENOMINATOR = horizontal resolution of source.

It is preferred that both horizontal components are integers less than 256 (and thus can be held in one byte). To achieve this, the components of the horizontal scaling factor are reduced to their lowest common denominator form (LCD). Of course, to obtain both components less then 256, slight modifications to the various resolutions before reduction may be required.

With the horizontal scaling factor determined, the gray scaling program 200 proceeds with the determination of a vertical scaling factor, step 206. The vertical scaling factor relates the vertical resolution of the destination to the vertical resolution of the source. Step 206 is accomplished by setting:

VERTICAL_NUMERATOR = vertical resolution of destination;

VERTICAL_DENOMINATOR = vertical resolution of source.

The components of the vertical scaling factor are also preferably reduced to their lowest common denominator form and are also both less than 256. Again, slight modifications of the various resolutions before reduction may be required.

After the components of the horizontal and vertical scaling factors are determined, the next step is the determination of the width of the destination output, referred to as DST_WIDTH, step 208. While the illustrated embodiment has a DST_WIDTH that corresponds to the number of pixels in a scan line of the display that are used to produce the gray scaled image, other embodiments may have a DST_WIDTH dependent upon such things as printer pixels or memory assignments. In any event, DST_WIDTH represents the number of data elements that each source scan line is mapped into. Step 208 is performed by multiplying the width of the original facsimile image (in pixels) by the horizontal resolution of the destination and then dividing that product by the horizontal resolution of the source (together being the horizontal scaling factor).

Next, the number of destination scan lines, called #DST_SCAN_LINES, is found, step 210. #DST_SCAN_LINES represents the number of scan lines used in the display used to produce the visual image. Step 210 is performed by setting #DST_SCAN_LINES equal to (1) the height (in scan lines) of the source data times the vertical resolution of the destination (2) divided by the vertical resolution of the source.

To assist in decoding and gray scaling, several useful counters are then initialized, step 212. Specifically, a source scan line counter and a destination scan line counter, referred to as SRC_SCAN_LINE and DST_SCAN_LINE, respectively, are initialized to zero. SRC_SCAN_LINE specifies which source scan line is being processed, while DST_SCAN_LINE tracks which destination scan line is being gray scaled. After step 212, the entries of a conversion vector are all initialized to zero, step 214. The conversion vector is a vector having entries in a one-to-one relationship with gray scaled data points of a scan line (specifically the display scan line DST_SCAN_LINE). In the preferred embodiment the entries of the conversion vector may contain only integers. Next, a variable VALUE_OF_BLACK is initialized to zero, step 216. VALUE_OF_BLACK stores the largest possible entry is the conversion vector and is updated upon completion of gray scaling of each DST_SCAN_LINE (as described below).

Figure 3:
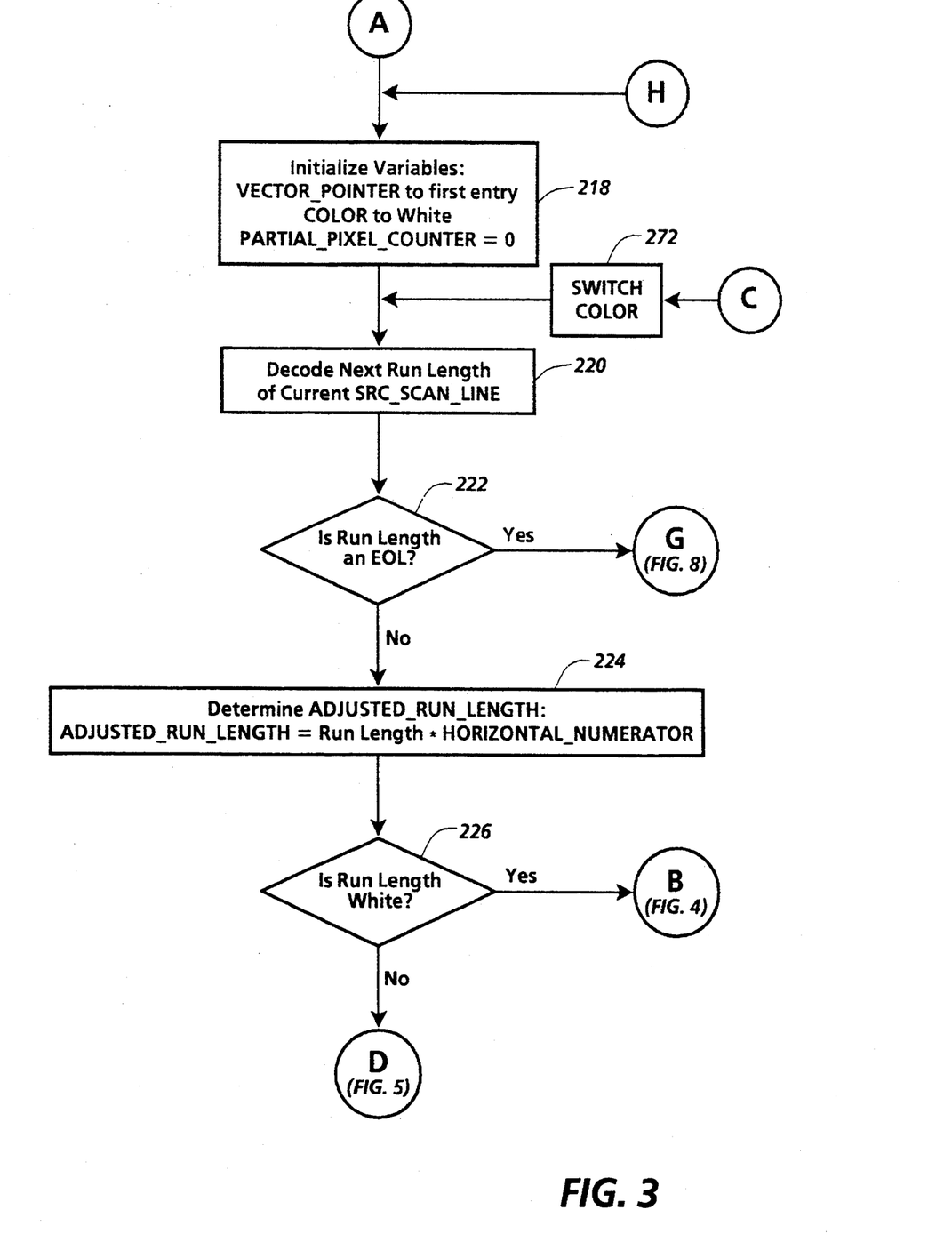
FIG. 3 is a continuation from FIG. 2 of the gray scaling program 200.

Referring now to FIG. 3, after step 216 several control variables are initialized, step 218. Specifically, a pointer VECTOR_POINTER, a variable COLOR, and a counter PARTIAL_PIXEL_COUNTER. The VECTOR_POINTER is a pointer that specifies which entry of the conversion vector can be changed (referred to hereinafter as the active entry). The VECTOR_POINTER is initialized so that the first conversion vector entry (corresponding to the left most pixel) is active. COLOR is a toggle that identifies the color (either black or white) of the source run length being processed; it is initialized to white. Finally, the PARTIAL_PIXEL_COUNTER is initialized to zero. The VECTOR_POINTER and the PARTIAL_PIXEL_COUNTER are related; the PARTIAL_PIXEL_COUNTER specifies the degree to which the active entry is affected by processed source run lengths. A PARTIAL_PIXEL_COUNTER count equal to the HORIZONTAL_DENOMINATOR is equivalent to the active entry being completely affected. The use of these control variables will become clearer as the explanation of the gray scaling program 200 proceeds.

After step 218, the decoding of a run length of the source scan line specified by SRC_SCAN_LINE occurs. Specifically, the next unprocessed source image run length is identified and decoded, step 220. The first run length of SRC_SCAN_LINE 0 is decoded in the first pass through step 220. A determination is then made as to whether the decoded run length is truly a run length, or whether it is actually an end-of-line code (EOL), step 222. Assuming that it is a run length, the decoded length is multiplied by the value of the HORIZONTAL_NUMERATOR to determined an adjusted run length, called ADJUSTED_RUN_LENGTH, step 224. A determination is then made, by checking COLOR, as to whether the run length being processed is white (the first run length of each scan line is always white), step 226.

Figure 4:
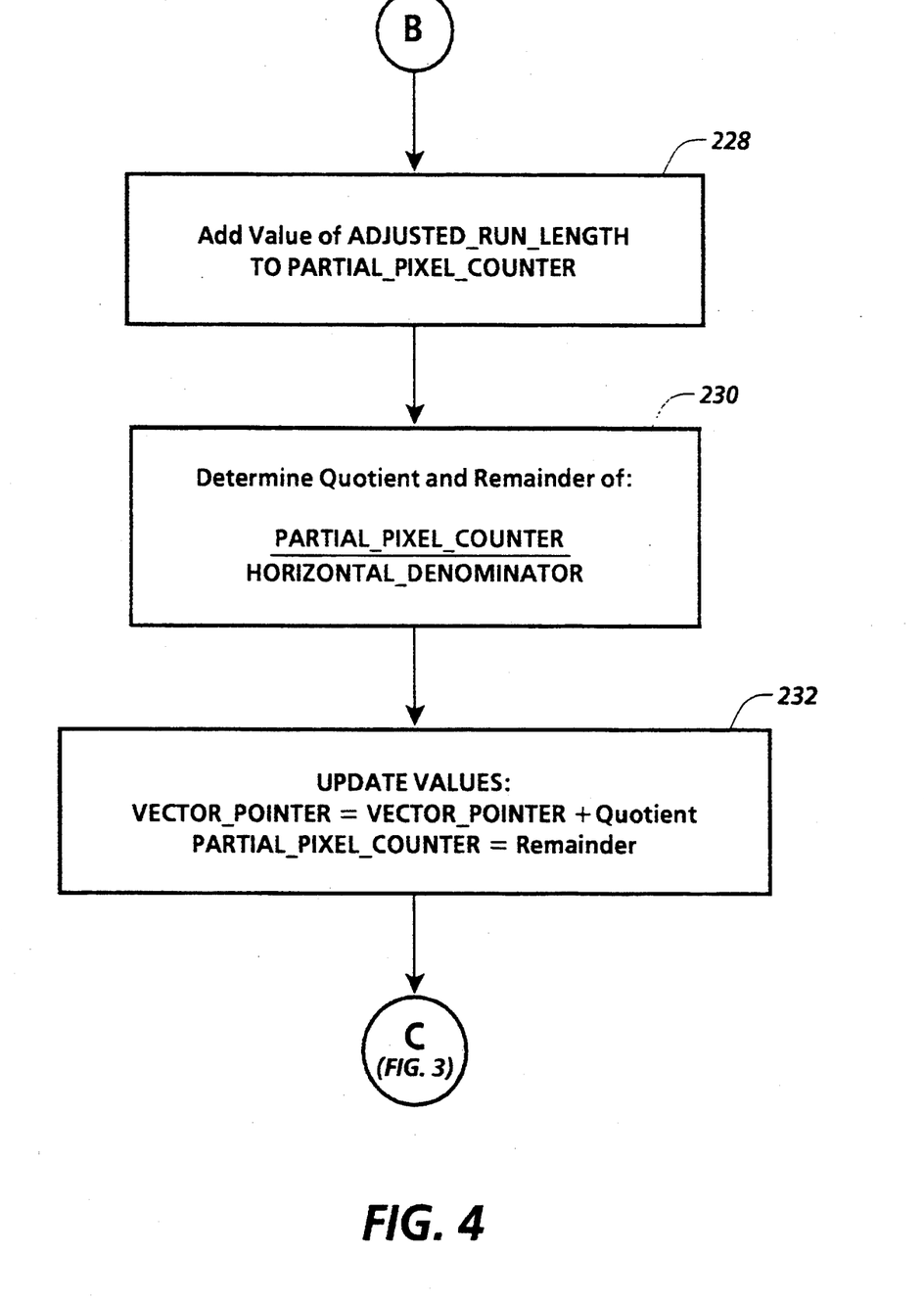
FIG. 4 is a continuation from FIG. 3 of the gray scaling program 200.

If the source run length is white, the position of the beginning of the following black run (run lengths alternate between white and black) is determined per FIG. 4. The determination has two parts, the pixel (or, equivalently, the conversion vector entry)where the following black run begins must be found and how much of that pixel is related to the current white run must be specified. The initial step is to add the value of the ADJUSTED_RUN_LENGTH into the PARTIAL_PIXEL_COUNTER, step 228. Next, the content of the PARTIAL_PIXEL_COUNTER is divided by the HORIZONTAL_DENOMINATOR to determine a quotient and a remainder, step 230. The quotient represents how many pixels (conversion entries) are spanned by the white ADJUSTED_RUN_LENGTH; the remainder represents the degree to which the pixel on which the white run ends is associated with that white run. Thus, to specify the position where the following black run starts, the VECTOR_POINTER is advanced by the quotient while the remainder is stored in the PARTIAL_PIXEL_COUNTER, step 232.

After step 232, operation of the program passes to step 272 (discussed in more detail below), shown on FIG. 3.

However, if per step 226 (see FIG. 3) it is determined that the source run length is black, the subsequent procedure is somewhat more complicated. Not only must the starting pixel (conversion entry) of the following white run and the degree to which that pixel (conversion entry) is affected by the current black run be found, but numerical values must be determined and added into the entries of the conversion vector associated with the black run. Those numerical values specify the degree to which the black run "spans" each entry. For example, if a black ADJUSTED_RUN_LENGTH completely spans a display pixel, a given value (usually the HORIZONTAL_DENOMINATOR, see below) representing black is added to the conversion vector entry associated with that pixel. If a black ADJUSTED_RUN_LENGTH effectively spans only half a pixel, only half of the given value is added to the associated entry. Since, as described below, the entries of the conversion vector are scaled so that 0 corresponds to white and the largest possible entry (VALUE_OF_BLACK) corresponds to black, the given number for black is not critical. However, the given number is preferably equal to the value of the HORIZONTAL_DENOMINATOR since that value is an integer (fast processing) less than 256 (storable in one byte) and is intimately related to divisions of the PARTIAL_PIXEL_COUNTER (thus fractional values are avoided).

Figure 5:
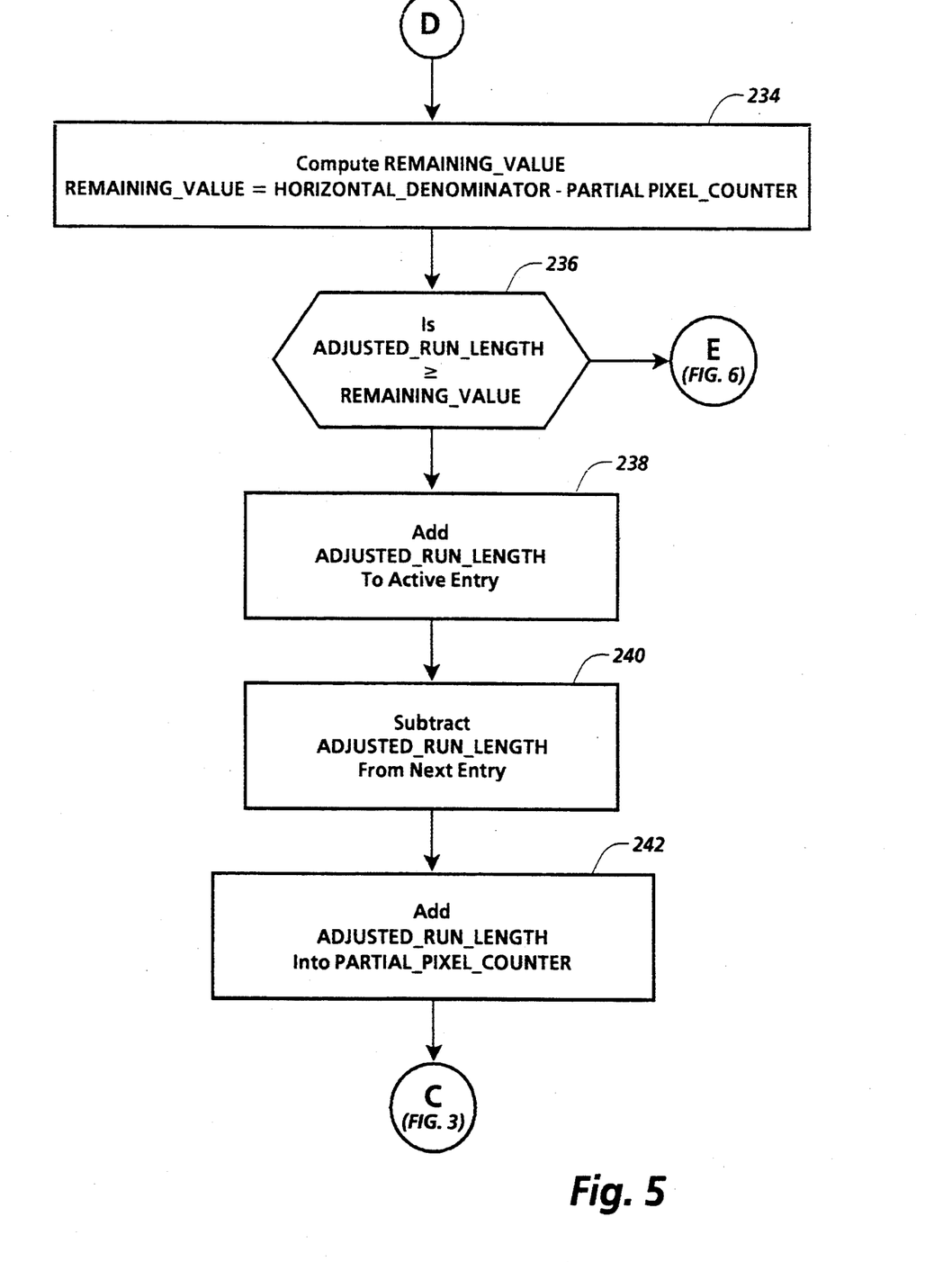
FIG. 5 is a continuation from FIG. 3 of the gray scaling program 200.

The procedure for processing a black run length after step 226 is shown beginning on FIG. 5. The procedure begins with a determination of a quantity called REMAINING_VALUE, step 234. REMAINING_VALUE specifies how much of the active pixel remains to be influenced by the black run. The REMAINING VALUE is set equal to:

HORIZONTAL_DENOMINATOR − PARTIAL_PIXEL_COUNTER.

With the REMAINING_VALUE known, a determination is made as to whether the black ADJUSTED_RUN_LENGTH completely spans the remainder of the active pixel, step 236. This is performed by determining if the ADJUSTED_RUN_LENGTH is greater than or equal to REMAINING_VALUE. If only the active pixel is directly affected by the black run, the value of the ADJUSTED_RUN_LENGTH is added to the active entry, step 238. The ADJUSTED_RUN_LENGTH is then subtracted from the following entry, step 240 (a negative number may result). While the VECTOR_POINTER must be advanced to perform step 240, the VECTOR_POINTER is returned so that the active entry is the same as when step 238 was performed. After step 240, the value of the ADJUSTED_RUN_LENGTH is added to the PARTIAL_PIXEL_COUNTER, step 242. Processing then goes to step 272 (shown on FIG. 3).

Figure 6:
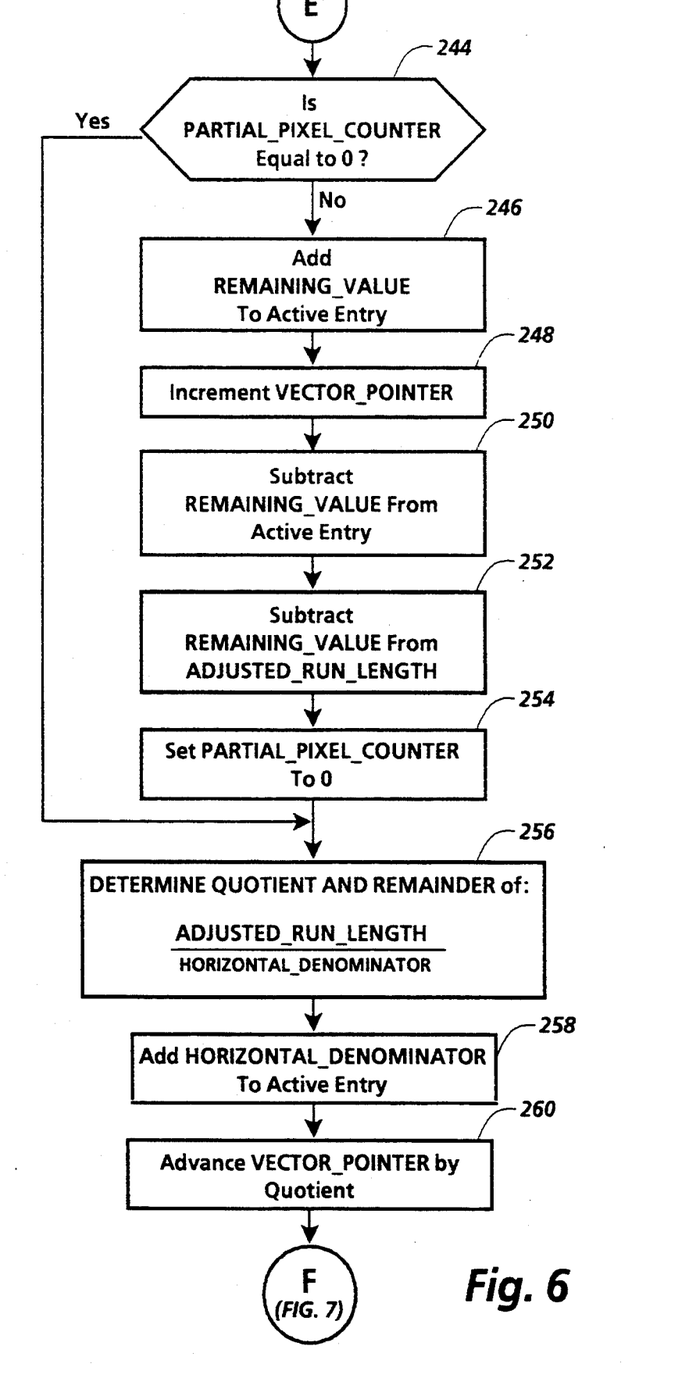
FIG. 6 is a continuation from FIG. 5 of the gray scaling program 200.

However, if per step 236 the ADJUSTED_RUN_LENGTH is found to affect more than one pixel, the procedure begun on FIG. 6 is followed. A determination is made as to whether the previous white run has affected the active entry, step 244. This is readily performed by checking whether the PARTIAL_PIXEL_COUNTER is equal to 0. If the PARTIAL_PIXEL_COUNTER is not equal to 0, the previous white run has affected the active entry, and thus that entry must be scaled separately. This scaling is performed by first adding the REMAINING_VALUE to the active entry, step 246, and then incrementing the VECTOR_POINTER, step 248. The REMAINING_VALUE is then subtracted from the new active entry and from the ADJUSTED_RUN_LENGTH, steps 250 and 252, respectively, and the PARTIAL_PIXEL_COUNTER is then zeroed, step 254.

If the PARTIAL_PIXEL_COUNTER was equal to 0 in step 244, or after completion of step 254, the PARTIAL_PIXEL_COUNTER is equal to 0 (signifying that the active entry has not been affected by the previous white run). The entries affected by the black ADJUSTED_RUN_LENGTH are then determined. The first step in this process involves determining, per step 256, the quotient and remainder of:

ADJUSTED_RUN_LENGTH÷HORIZONTAL_DENOMINATOR.

Figure 7:
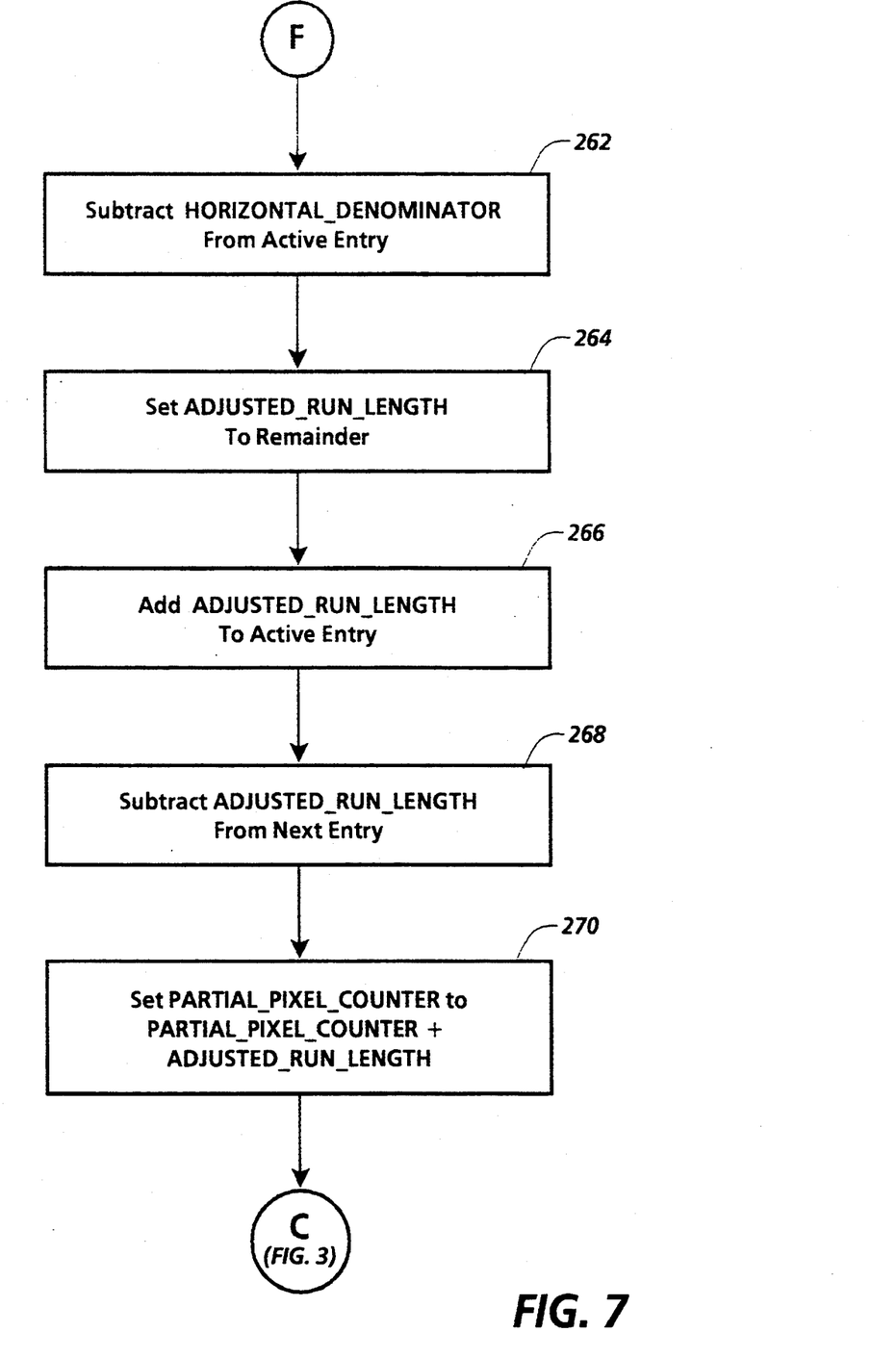
FIG. 7 is a continuation from FIG. 6 of the gray scaling program 200.

The HORIZONTAL_DENOMINATOR is then added to the active entry, step 258, and the VECTOR_POINTER is advanced by the quotient, step 260. Referring now to FIG. 7, after step 260 the HORIZONTAL_DENOMINATOR is subtracted from the new active entry, step 262. The ADJUSTED_RUN_LENGTH is then set equal to the remainder (from step 256), step 264, and the new ADJUSTED_RUN_LENGTH is added to the active entry, step 266. The ADJUSTED_RUN_LENGTH is then subtracted from the next conversion vector entry, step 268. While the VECTOR_POINTER must be advanced to perform step 268, the VECTOR_POINTER is returned so that the active entry is the same as when step 266 was performed. After step 268, the value of the ADJUSTED_RUN_LENGTH is added to the PARTIAL_PIXEL_COUNTER, step 270. Processing then goes to step 272 (shown on FIG. 3).

Whether the run length being processed is white or black, program operation eventually passes to step 272 on (FIG. 3). Per step 272, if the processed run was white, the COLOR toggle is switched to black; if the processed run was black, the COLOR toggle is switched to white. Program operation then returns to step 220 for processing of the next run length. Looping through step 220 continues until an end-of-line is found in step 222.

Figure 8:
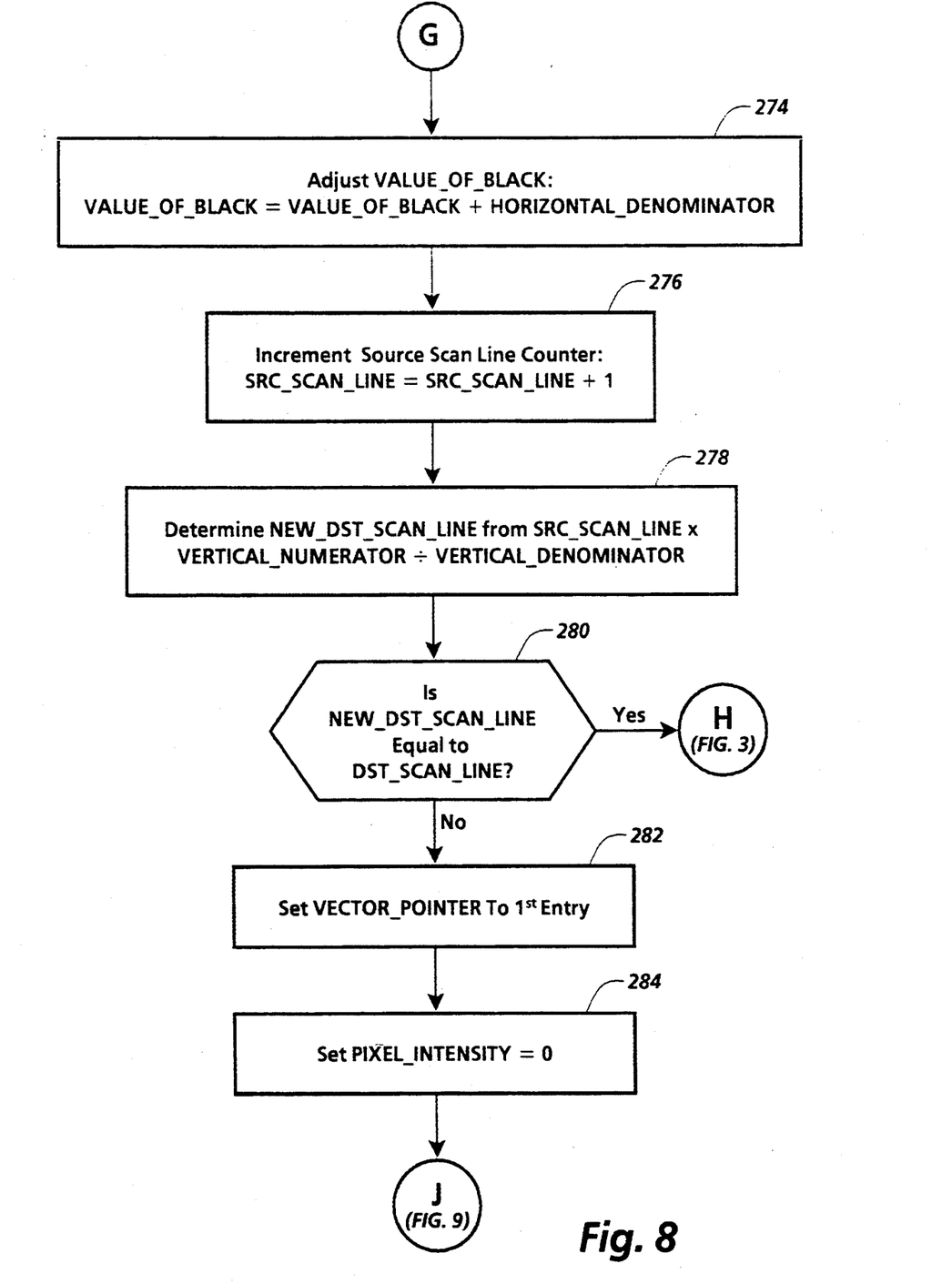
FIG. 8 is a continuation from FIG. 3 of the gray scaling program 200.

When an EOL is detected in step 222, the gray scale program proceeds as using the process illustrated beginning on FIG. 8. First, the VALUE_OF_BLACK is updated, per step 274, to:

VALUE_OF_BLACK=VALUE_OF_BLACK+HORIZONTAL_DENOMINATOR.

Since an EOL indicates that a source scan line has been completely processed, the source scan line counter SRC_SCAN_LINE is then incremented by 1, step 276. Because several source scan lines may be processed into the same destination scan line, a determination is made as to whether the current destination scan line is complete. To assist in determining this, a value NEW_DST_SCAN_LINE is found, per step 278, using integer arithmetic:

NEW_DST_SCAN_LINE=SRC_SCAN_LINE×VERTICAL_NUMERATOR÷VERTICAL_DENOMINATOR.

Figure 9:
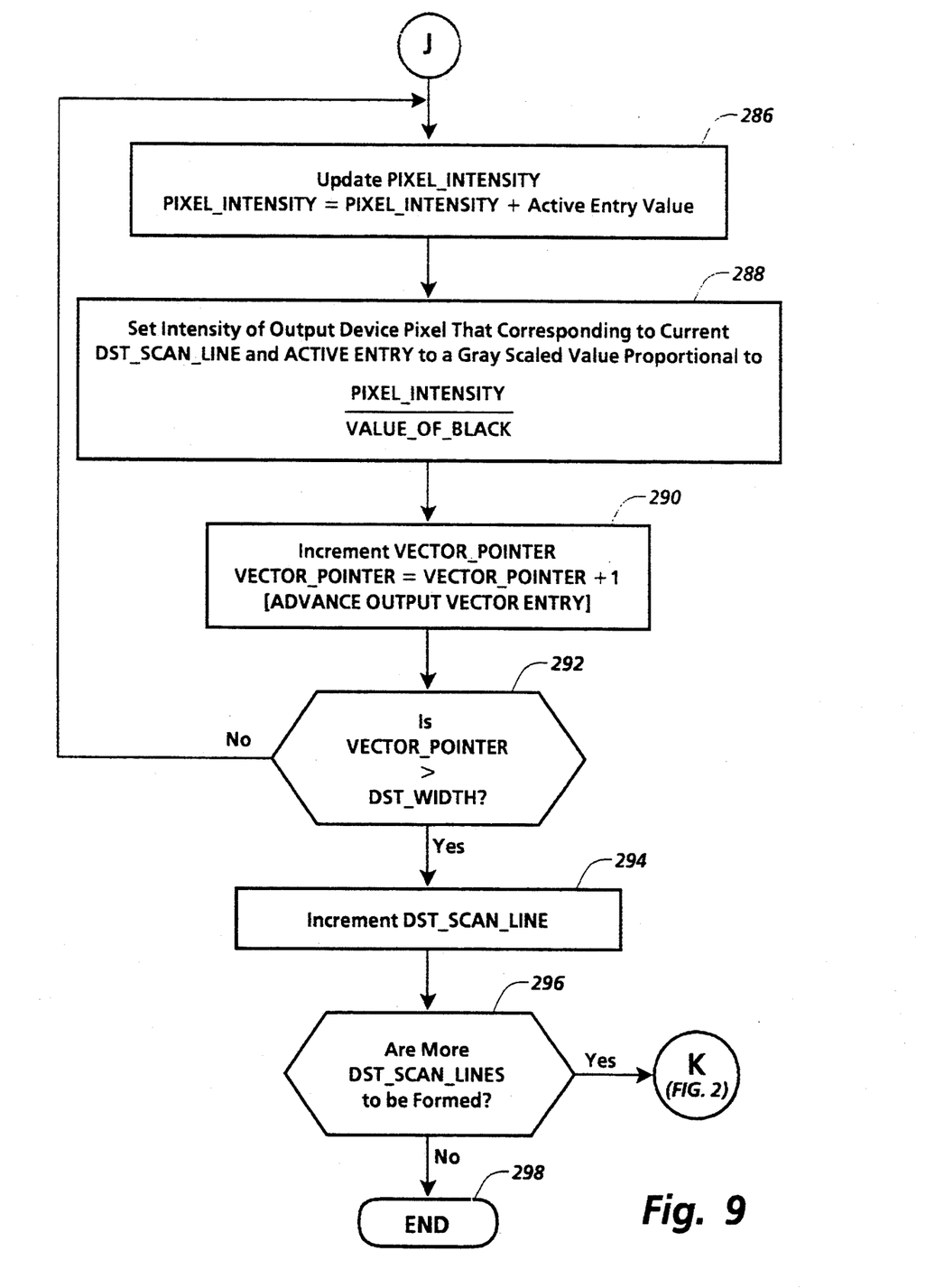
FIG. 9 is a continuation from FIG. 8 of the gray scaling program 200.

A comparison is then made as to whether the NEW_DST_SCAN_LINE is equal to the DST_SCAN_LINE, step 280. If those values are equal, then the destination scan line for the new source scan line is the same as the previous destination scan line (i.e., multiple source scan lines are mapped into the same destination scan line). Thus program operation loops back to step 218 (see FIG. 3) for processing of the next source scan line. However, if the NEW_DST_SCAN_LINE is not equal to the DST_SCAN_LINE, it is known that the current destination scan line is complete. In that case, final computation of gray scale values for the individual pixels of the completed destination scan line is performed. First the VECTOR_POINTER is reset to the first entry of the conversion vector, step 282. Next, a variable PIXEL_INTENSITY is initialized to zero, step 284. Computation proceeds as shown on FIG. 9. Per step 286 the value of PIXEL_INTENSITY is updated to:

PIXEL_INTENSITY=PIXEL_INTENSITY+active entry value.

Next, the intensity of the display pixel that corresponds to the active entry is adjusted to a gray scale value based upon the PIXEL_INTENSITY and the VALUE_OF_BLACK, step 288. This is performed by setting that pixel gray scale value proportional to PIXEL_INTENSITY+VALUE_OF_BLACK. The VECTOR_POINTER is then incremented to make the next conversion vector entry active, step 290. A determination is then made as to whether all of the pixel intensities for the current destination scan line have been gray scaled, step 292. This is readily performed by determining if the VECTOR_POINTER has incremented beyond the width specified by DST_WIDTH. If not, program operation returns to step 286 for computation of the gray scale intensity of the next pixel. However, if step 292 indicates that all pixels corresponding to the current destination scan line have been gray scaled, the DST_SCAN_LINE is incremented, step 294, and a determination is made as to whether any additional scan lines are to be processed, step 296. This is performed by comparing #DST_SCAN_LINES with DST_SCAN_LINE. If they are not equal, more destination scan lines are to be processed and system operation loops back to step 214 on FIG. 2. However, if they are equal, no more scan lines are to be processed and the gray scaling program ends, step 298.

FIG. 3 helps illustrate the process of gray scaling according to the principles of the present invention. FIG. 3 shows part of one source scan line 300 comprised of 1728 pixels that is to be gray scaled into a destination scan line 302 of to 1296 pixels. Per step 204, after reduction the HORIZONTAL_NUMERATOR is 3 and the HORIZONTAL_DENOMINATOR IS 4. Per step 208, the DST_WIDTH is set to 1296. Since the gray scaling of only one source scan line will be carried out in this example, the vertical elements are not explicitly discussed. The source and destination scan lines, SRC_SCAN_LINE and DST_SCAN_LINE, respectively, are initialized to zero, step 212, as are all 1296 entries (one for each pixel in the destination scan line) of a conversion vector 304, step 214. The variable VALUE_OF_BLACK is also set to zero, step 216. The VECTOR_POINTER is initialized to the first entry of the conversion vector, the COLOR toggle is set to white, and the PARTIAL_PIXEL_COUNTER is initialized to zero, step 218.

The first run length of the source scan line 300 is read and decoded, step 220. As shown in FIG. 3, the first run length corresponds to a run of 4 white pixels (W4). Since the first run length is not an EOL (per step 222), the corresponding adjusted run length, ADJUSTED_RUN_LENGTH, of 12 is found by multiplying the run length (4) by the HORIZONTAL_NUMERATOR (3), step 224. Since the COLOR toggle for the first run length is set to white, operation passes from step 226 to step 228 on FIG. 3.

Per step 228, the ADJUSTED_RUN_LENGTH (12) is added to the PARTIAL_PIXEL_COUNTER. The value of the PARTIAL_PIXEL_COUNTER (12) is then divided by the HORIZONTAL_DENOMINATOR (4), step 230. The VECTOR_POINTER is then advanced by the quotient (3) to make the fourth entry of the conversion vector active, and the value of the PARTIAL_PIXEL_COUNTER is set to the remainder (0), step 232. The resulting contents of the first three entries of the conversion vector 304 are thus zero (as shown in FIG. 3). Operation of the gray scaling program proceeds to step 272 on FIG. 3. Per step 272, the COLOR toggle is set to black.

Per step 220, the second source scan line run length of 2 is decoded. Since that run length is not an EOL (step 222) the ADJUSTED_RUN_LENGTH of 6 is found, step 224. Since the second ADJUSTED_RUN_LENGTH is black, system operation passes from step 226 to step 234 on FIG. 5. The REMAINING_VALUE of 4 is computed per step 234 by setting REMAINING_VALUE=HORIZONTAL_DENOMINATOR (4)—PARTIAL_PIXEL_COUNTER (0). Since the ADJUSTED_RUN_LENGTH (6) is greater than the REMAINING_VALUE (4) per step 236, system operation passes to step 244 on FIG. 6. Additionally, since the PARTIAL_PIXEL_COUNTER equals 0, system operation passes from step 244 to step 256.

The quotient of 1 and the remainder of 2 is determined per step 256 from: ADJUSTED_RUN_LENGTH (6)÷HORIZONTAL_DENOMINATOR (4). The HORIZONTAL_DENOMINATOR (4) is added to the active entry (resulting in 4 in the fourth entry of the conversion vector 304 as shown on FIG. 3), step 258. The VECTOR_POINTER is then advanced by the quotient (making the fifth entry active), step 260. Per step 262 (see FIG. 7) the HORIZONTAL_DENOMINATOR (4) is then subtracted from the active entry (resulting in a —4 in the fifth entry) and the ADJUSTED_RUN_LENGTH is set equal to the remainder, step 264. The ADJUSTED_RUN_LENGTH (now 2) is added to the active entry (resulting in the —2 in the fifth entry of the conversion vector 304 as shown on FIG. 3) and subtracted from the next entry (resulting in the —2 in the sixth entry of the conversion vector 304 as shown on FIG. 3), steps 266 and 268, respectively. The PARTIAL_PIXEL_COUNTER is then set equal to the ADJUSTED_RUN_LENGTH (2), step 270. Operation of the gray scaling program proceeds to step 272 (see FIG. 3) wherein the COLOR toggle is set to white. The processing of subsequent run lengths on the source scan line 300 results in the conversion vector 304 as shown on FIG. 10.

When the EOL is detected in step 222, system operation proceeds as shown on FIG. 8. First, the VALUE_OF_BLACK is updated by adding in the value of the HORIZONTAL_DENOMINATOR (4) per step 274. Note that if multiple source scan lines were processed into the same destination scan line that the VALUE_OF_BLACK would be set equal to a multiple of the HORIZONTAL_DENOMINATOR. The source scan line is incremented (to 1) per step 276, and a NEW_DST_SCAN_LINE is computed using integer arithmetic per step 278 by multiplying the SRC_SCAN_LINE by the VERTICAL_NUMERATOR and dividing the result by the VERTICAL_DENOMINATOR. Because in the instant example only the processing of one source scan line is discussed, it is assumed that the vertical scaling factor is such that the NEW_DST_SCAN_LINE is not equal to the DST_SCAN_LINE (0). Per step 280, program operation then passes to step 282 where the determination of the final gray scale values for the individual display pixels begins.

Figure 10:
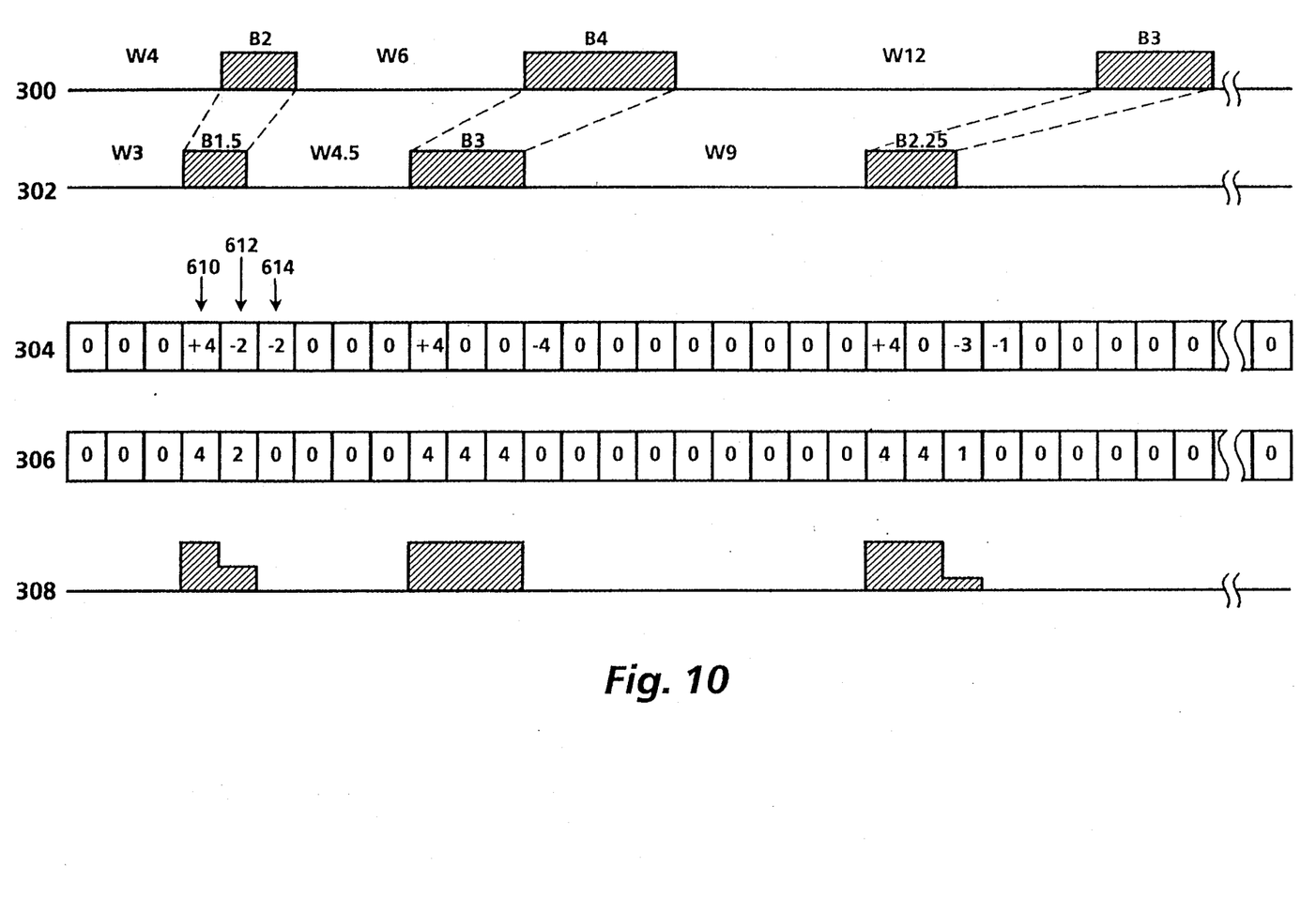
FIG. 10 helps in illustrating the process of gray scaling a scan line of facsimile image data.

The final gray scale values resulting from the entries of the conversion vector 304 are shown in output vector 306 in FIG. 10. Those values are found by first resetting the VECTOR_POINTER to the first conversion vector entry, step 282. Next, PIXEL_INTENSITY is initialized to zero, step 284. Referring now to FIG. 9, the value of PIXEL_INTENSITY is updated by adding into it the value of the active entry, step 286. The resulting value of zero (both the PIXEL_INTENSITY and the value of the active entry in the conversion vector 304 are zero) is input as the first entry of the output vector 306, step 288 (it is assumed in the instant example that the final gray scale values are equal to the PIXEL_INTENSITY, in other applications scaling, such as by multiplying by a constant, may be performed). The second entry of the conversion vector is then made active by incrementing the VECTOR_POINTER by 1, step 290. Additionally, the active entry of the output vector is also incremented so that the final gray scale value is input to the proper output vector entry. Since the VECTOR_POINTER has not exceeded the DST_WIDTH, additional entries of the conversion vector remain to be processed, step 292. The PIXEL_INTENSITY is then updated for the second entry, step 286. Note that when the fourth entry of the conversion entry is processed, a 4 results in the PIXEL_INTENSITY and thus fourth entry of the output vector becomes 4. When the fifth entry of the conversion entry is processed, —2 is added to the PIXEL_INTENSITY (4), resulting in a 2 in the fifth entry of the output vector (and in the PIXEL_INTENSITY). Subsequent processing results in the values in the output vector as shown in FIG. 3.

Eventually, the VECTOR_POINTER is incremented beyond the DST_WIDTH and operation passes from step 292 to step 294. A determination is made whether another DST_SCAN_LINE is to be formed. Since in the example only one line is processed, the gray scaling program terminates per step 298. The result of the processing of the source scan line 300 is representially illustrated by line 308 of FIG. 3. An output vector entry of 4 causes the associated pixel on the output device to be pure black; this is represented by a black bar which extends to a maximum height. A vector entry of 2 causes the associated pixel to be half-black pixels; this is represented by a black bar that extends to one-half of the maximum height. In the same manner, a 1 causes the associated pixel to be ¼ black (represented by a black bar that extends to ¼ of the maximum height).

From the foregoing, numerous modifications and variations of the principles of the present invention will be obvious to those skilled in its art. Therefore the scope of the present invention is to be defined by the appended claims.

What is claimed:

1. A method of producing gray scale data suitable for producing a gray scale reproduction of a source image on an output device using a computer, the computer including a memory coupled a processing device for executing instructions, the computer including to an input for receiving source scanlines, the output device having a plurality of addressable pixels organized in display scan lines, the gray scale data being produced from white and black source run lengths that are organized in source scan lines which terminate with an end-of-line character, said source scanlines together representing the source image, wherein each of said white source run lengths represent a number of consecutive white pixels that occur together in a segment of a one the source scan lines, and wherein each of said black source run lengths represent a number of consecutive black pixels that occur together in another segment of the one of the source scan lines, the method comprising the computer-implemented steps of:

(a) determining the data compression to be applied to the source scan lines based upon the number of pixels represented by each source scan line and upon the number of output device pixels;

(b) forming a conversion vector having entries, each entry having a one-to-one relationship with a one of the pixels of the output device, the conversion vector being stored in the memory;

(c) selecting a selected source scan line from the source scan lines;

(d) associating the beginning of each black source run length in the selected source scan line with a beginning entry, the beginning entry being a one of the entries of the conversion vector, using the compression determined in step (a) and the total number of source scan line pixels represented by all white and black run lengths which precede the particular black source run length being associated;

(e) determining if each black source run length spans the remainder of its associated beginning entry;

(f) adding a first numerical value for each black source run length to its associated beginning entry, said first numerical value based upon the degree to which each black source run length spans its associated beginning entry;

(g) subtracting said first numerical value from a following conversion vector entry of each black source run length that does not span the remainder of its associated beginning entry;

(h) determining if each black source run length that does span the remainder of its associated beginning entry completely spans its associated beginning entry;

(i) subtracting said first numerical value from the following conversion vector entry of each black source run length that spans the remainder of its associated beginning entry but does not completely span its associated beginning entry;

(j) adding a second numerical value to the following conversion vector entry for each black source run length that spans the remainder of its associated beginning entry but that does not completely span its associated beginning entry, said second numerical value being equivalent to a first numerical value for a black source run length that completely spans its associated beginning entry;

(k) associating the end of each black source run length that spans the remainder of its associated beginning entry with an associated ending entry of the conversion vector;

(l) subtracting said second numerical value from the associated ending entry;

(m) adding a third numerical value for each black source run length that spans the remainder of its associated beginning entry to the associated ending entry, said third numerical value based upon the degree to which each black source run length spans its associated ending entry;

(n) subtracting said third numerical value from the entry following said ending entry;

(o) restoring the conversion vector to the memory; and (p) producing a gray scale reproduction of the source image by providing the values of the entries of the stored conversion vector to the output device to control the pixels of the output device.

2. The method according to claim 1, further including the computer-implemented step of converting the numerical values of the conversion vector entries to intensity values suitable for controlling the intensity of individual pixels of the output device prior to performing step (o).

3. The method according to claim 2, wherein the compression determined in step (a) includes the computer-implemented step of determining a vertical scaling factor dependent upon the number of source scan lines to be gray scaled and upon the number of destination scan lines.

4. The method according to claim 2, wherein the computer-implemented step of converting the numerical values of the conversion vector entries to intensity values includes the computer-implemented steps of:

(q) forming an output vector having entries, each output vector entry representing a one-to-one relationship with a one of the pixels of a display scan line and with a one of the entries of the conversion vector;

(r) selecting a selected conversion vector entry of the conversion vector entries;

(s) adding together the values of all of the entries of the conversion vector from the first conversion vector entry to the selected conversion vector entry, inclusive, to determine a sum;

(t) setting the value of the output vector related in a one-to-one relationship with the selected conversion vector entry to a value based upon said sum; and (u) repeating steps (r), (s), and (t) until each conversion vector entry has been selected as the selected conversion vector entry.

5. The method according to claim 4, wherein the compression determined in step (a) includes the step of determining a vertical scaling factor dependent upon the number of source scan lines to be gray scaled and upon the number of display scan lines.

6. A computer-implemented method of producing gray scale data suitable for forming a gray scale reproduction of a source image on a display device using a computer, the computer including a memory coupled to a processing device for executing instructions, the display device having a plurality of addressable display pixels organized by display scan lines, the gray scale data being produced from facsimile image data comprised of black and white source run lengths organized by source scan lines that terminate with an end-of-line character, the source scanlines representing the source image, each of said white source run lengths representing the number of consecutive white pixels that occur in a source scan line, and each of said black source run lengths representing the number of consecutive black pixels that occur in a source scan line, the method comprising the computer-implemented steps of:

(a) determining the compression to be applied to the source run lengths based upon the number of facsimile image pixels represented by each source scan line and upon the number of display pixels to be used to produce the gray scale image;

(b) forming a conversion vector having entries, each conversion vector entry having a one-to-one relationship with a one of the pixels of the display device, the conversion vector being stored in the memory;

(c) selecting a source scan line from the source scan lines;

(d) associating the beginning of each black source run length in the selected source scan line with a one of the conversion vector entries using the compression determined in step (a) and the total number of source scan line pixels represented by all white and black run lengths which precede the particular black source run length being associated;

(e) determining if each black source run length spans the remainder of its associated beginning entry;

(f) adding a first numerical value for each black source run length to each beginning entry, said first numerical value based upon the degree to which each black source run length spans its associated beginning entry;

(g) subtracting said first numerical value from a next conversion vector entry for each black source run length that does not span the remainder of its associated beginning entry;

(h) determining if each black source run length that does span the remainder of its associated beginning entry completely spans its associated beginning entry;

(i) subtracting said first numerical value from the next conversion vector entry for each black source run length that spans the remainder of its associated beginning entry but that does not completely span its associated beginning entry;

(j) adding a second numerical value to the next conversion vector entry for each black source run length that spans the remainder of its associated beginning entry but that does not completely span its associated beginning entry, said second numerical value being equivalent to a first numerical value for a black source run length that completely spans its associated beginning entry;

(k) associating the end of each black source run length that spans the remainder of its associated beginning entry with an ending entry the ending entry being a one of the entries of the conversion vector;

(l) subtracting said second numerical value from the associated ending entry;

(m) adding a third numerical value for each black source run length that spans the remainder of its associated beginning entry to said associated ending entry, said third numerical value based upon the degree to which each black source run length spans its associated ending entry;

(n) subtracting said third numerical value from an entry following said associated ending entry;

(o) restoring the conversion vector to the memory; and (p) producing a gray scale reproduction of the source image on the display device by using the stored conversion vector to control the pixels of the display device.

7. The computer-implemented method according to claim 6 further including the computer-implemented step of converting the conversion vector entries to intensity values suitable for controlling the intensity of individual pixels of the display device prior to performing step (o).

8. The computer implemented method according to claim 6, wherein the compression determined in step (a) includes the computer-implemented step of determining a vertical scaling factor dependent upon the number of source scan lines and upon the number of display scan lines to be used for producing the gray scale image.

9. The computer-implemented method according to claim 8, wherein the step of converting the conversion vector entries to intensity values includes the computer-implemented steps of:

(q) forming an output vector having entries each entry representing a one-to-one relationship with a one of the pixels of the display device scan line to be used to produce the gray scale image and with a one of the entries of the conversion vector;

(r) selecting a one of the conversion vector entries as a selected conversion vector entry;

(s) adding together the values of all of the entries of the conversion vector from a first conversion vector entry to the selected conversion vector entry, inclusive, to determine a sum;

(t) setting the value of the output vector related in a one-to-one relationship with the selected conversion vector entry to a value based upon said sum; and (u) repeating steps (s), (t), and (u) until each conversion vector entry has been selected as the selected conversion vector entry.

10. The computer-implemented method according to claim 9, wherein the compression determined in step (a) includes the step of determining a vertical scaling factor dependent upon the number of source scan lines and upon the number of display scan lines to be used for producing the gray scale image.

11. An apparatus for producing a gray scale reproduction of a source image on a display device that has a plurality of addressable pixels organizable by display scan lines, the gray scale image being produced from facsimile image data representing the source image and comprised of black and white run lengths organized into facsimile scan lines that terminate with and end-of-line character, and wherein said black and white run lengths represent, respectively, the number of consecutive black and white pixels in each facsimile scan line, the apparatus comprising:

means for determining the compression to be applied to the black and white run lengths based upon the number of facsimile image pixels represented by each facsimile scan line and upon the number of display pixels to be used to produce the gray scale image;

means for reading said facsimile image data;

a first memory storing a conversion vector having entries, each entry having a one-to-one relationship with a one of the pixels of the display device, said first memory having a memory location associated with each entry;

means for associating the beginning of each black facsimile image run length with a beginning entry of the conversion vector using the determined compression and the total number of pixels in a facsimile scan line which precede the particular black facsimile image run length being associated;

means for determining if each black facsimile run length spans the remainder of its associated beginning entry;

means for adding a first numerical value for each black facsimile run length to each memory location of said first memory that is associated with each beginning entry, said first numerical value based upon the degree to which each black facsimile run length spans its beginning entry;

means for subtracting said first numerical value from the memory location of said first memory that is associated with the conversion vector entry that follows each beginning entry that does not span the remainder of its associated beginning entry;

means for determining if each black facsimile run length that spans the remainder of its associated beginning entry completely spans its corresponding beginning entry;

means for subtracting said first numerical value from the memory location of said first memory that is associated with the conversion vector entry that follows each beginning entry for each black facsimile run length that spans the remainder of its associated entry but that does not completely span its associated beginning entry;

means for adding a second numerical value to the memory location of said first memory that is associated with the conversion vector entry that follows each beginning entry for each black facsimile run length that spans the remainder of its associated entry but that does not completely span its associated beginning entry, said second numerical value being equivalent to a first numerical value for a black facsimile run length that completely spans its associated beginning entry;

means for associating the end of each black facsimile run length that spans the remainder of its corresponding beginning entry with a memory location within said first memory;

means for subtracting said second numerical value from the memory location of said first memory that is associated with the end of each black facsimile run length;

means for adding a third numerical value to the memory location of said first memory that is associated with the end of each black facsimile run length for each black source run length that spans the remainder of its corresponding beginning entry to said ending entry, said third numerical value based upon the degree to which each black source run length spans its ending entry;

means for subtracting said third numerical value from the memory location of said first memory that is associated with the next conversion vector entry that follows said ending entry;

means for storing the conversion vector to said first memory; and means for producing a gray scale reproduction of the source image on the display device using the contents of said first memory.

12. The apparatus according to claim 11, further including a means for receiving facsimile image data.

* * * * *